(12) United States Patent
Liu

(10) Patent No.: US 12,370,892 B2
(45) Date of Patent: Jul. 29, 2025

(54) USER INTERFACE FOR CONTROLLING SAFETY CRITICAL FUNCTIONS OF A VEHICLE

(71) Applicant: Shenzhen Yinwang Intelligent Technologies Co., Ltd., Shenzhen (CN)

(72) Inventor: Ming Liu, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 161 days.

(21) Appl. No.: 18/182,933

(22) Filed: Mar. 13, 2023

(65) Prior Publication Data

US 2023/0256827 A1 Aug. 17, 2023

Related U.S. Application Data

(63) Continuation of application No. PCT/EP2020/075633, filed on Sep. 14, 2020.

(51) Int. Cl.
*B60K 35/10* (2024.01)
*B60K 35/65* (2024.01)

(52) U.S. Cl.
CPC .............. *B60K 35/10* (2024.01); *B60K 35/65* (2024.01); *B60K 35/654* (2024.01); *B60K 2360/126* (2024.01); *B60K 2360/1438* (2024.01); *B60K 2360/741* (2024.01)

(58) Field of Classification Search
CPC ........ B60K 35/10; B60K 35/23; B60K 35/25; B60K 35/29; B60K 35/60; B60K 35/80; B60K 35/65; B60K 35/656; B60K 35/654; B60K 2360/143; B60K 2360/1438; B60K 2360/197; B60K 2360/741; B60K 2360/126; B60K 2360/195; B60K 2360/128; B60K 2360/141; B60K 2360/782; G06F 3/044; G06F 3/01; G06F 3/0482; G06F 3/016; G06F 3/0487;

(Continued)

(56) References Cited

U.S. PATENT DOCUMENTS 9,333,983 B2 * 5/2016 Lathrop ................. B60K 35/22
9,457,816 B2 * 10/2016 Van Wiemeersch .. B60W 50/12
9,475,496 B2 * 10/2016 Attard ................. B60W 30/182

(Continued)

FOREIGN PATENT DOCUMENTS

CN 108170264 A 6/2018
CN 109982885 A 7/2019

(Continued)

*Primary Examiner* — Logan M Kraft
*Assistant Examiner* — Johnny H Hoang
(74) *Attorney, Agent, or Firm* — Leydig, Voit & Mayer, Ltd.

(57) ABSTRACT

A user interface for controlling a function of a vehicle is provided. The user interface comprises a manual input device for generating a user input signal in response to manual actuation by a user and one or more proximity sensors for being arranged in a vicinity of the manual input device, wherein each proximity sensor is configured to generate a proximity sensor signal in response to presence of a hand in a vicinity of the proximity sensor. Furthermore, the user interface comprises a processing circuitry configured to control the function of the vehicle based on the user input signal and the one or more proximity sensor signals.

9 Claims, 3 Drawing Sheets

(58) Field of Classification Search
CPC ......... G06F 3/0488; B62D 1/06; B62D 1/046;
B60R 16/02
See application file for complete search history.

(56) References Cited

U.S. PATENT DOCUMENTS

| | | | |
|---|---|---|---|
| 9,477,332 B2* | 10/2016 | Cuddihy | ................ B60K 35/60 |
| 2005/0093368 A1 | 5/2005 | Takaku et al. | |
| 2007/0262953 A1 | 11/2007 | Zackschewski | |
| 2014/0106726 A1 | 4/2014 | Crosbie et al. | |
| 2018/0088661 A1 | 3/2018 | Betancourt | |
| 2019/0337528 A1* | 11/2019 | Baumer | ................ B60K 35/80 |
| 2020/0139814 A1* | 5/2020 | Galan Garcia | ......... B32B 5/028 |
| 2021/0103332 A1* | 4/2021 | Mehandjiysky | ...... G06F 3/0219 |

FOREIGN PATENT DOCUMENTS

| | | |
|---|---|---|
| CN | 111295642 A | 6/2020 |
| DE | 102009018678 A1 | 10/2010 |
| DE | 102017202051 A1 | 8/2018 |
| GB | 2428094 A | 1/2007 |

\* cited by examiner

USER INTERFACE FOR CONTROLLING SAFETY CRITICAL FUNCTIONS OF A VEHICLE

CROSS-REFERENCE TO RELATED APPLICATIONS

This application is a continuation of International Application No. PCT/EP2020/075633, filed on Sep. 14, 2020, the disclosure of which is hereby incorporated by reference in its entirety.

TECHNICAL FIELD

The present disclosure relates to automotive safety in general. More specifically, the disclosure relates to a user interface for controlling safety critical functions of a vehicle as well as a vehicle comprising such a user interface.

BACKGROUND

When a vehicle is moving on the road especially at a high speed, it may result in high safety risks, if the driver conducts complex operations on the center console of an in-vehicle infotainment (IVI) and cockpit and is distracted from monitoring the road conditions. In order to constrain some types of in-vehicle-infotainment and cockpit operations at a high vehicle speed, conventional solutions normally simply prohibit the operations and stop them from being executed.

For instance, some vehicle settings are prohibited from being able to be changed beyond a vehicle speed threshold, in order to force the driver to keep full concentration on monitoring the road condition and not be distracted. Another example is to prohibit some applications from being executed in case of a moving car, such as messengers or video players. The prohibited operations may include actions both directly on the console devices of an in-vehicle infotainment (IVI), instrument cluster (IC) or cockpit with manual control elements, such as touch screens, buttons, or knobs, etc., and on the steering wheel buttons.

However, the above conventional solutions have one drawback in that operations are not distinguished between operations that are performed by the driver or another passenger of the vehicle. Operations by, for instance, the co-driver will not result in safety threats and should be allowed for more entertainment and convenience purposes. For example, to type in a new destination address for navigation at a high vehicle speed is life threatening due to the distraction of the driver. Nevertheless, if the co-driver could do it for the driver, it will be much helpful to update the navigation destination immediately and give a quick guidance to the driver with a new path.

In light of above, there is a need for an improved user interface for controlling safety critical functions of a vehicle.

SUMMARY

The present disclosure provides an improved user interface for controlling safety critical functions of a vehicle.

Generally, embodiments disclosed herein realize driving safety by preventing a driver from operating a console user interface of a vehicle and being distracted during the movement of the vehicle. On the other hand, the operation actions can still be performed by other passengers of the vehicle, in particular the co-driver. In this regard, embodiments disclosed herein distinguish whether operations on the in-vehicle infotainment (IVI) and cockpit of the vehicle are conducted by the driver or the co-driver of the vehicle. The operations by the co-driver are permitted and can take effect, while the ones by the driver may be denied and generate a safety alert message to the driver. This provides the advantage of keeping the convenience of co-driver operations but avoiding life-threatening operations by the driver.

Thus, an improved user interface is provided, allowing for controlling a function, for instance application of an electronic system of a vehicle in a secure manner. This enables driving safety by preventing a driver from operating a console interface of a vehicle during motion of the vehicle but allowing a co-driver to operate the console interface.

According to a first aspect, a user interface for controlling a function of a vehicle is provided. The function of the vehicle may comprise safety critical functions as well as safety uncritical functions of the vehicle.

The user interface comprises a manual input device for generating a user input signal in response to being manually actuated by a user. Moreover, the user interface comprises one or more proximity sensors for being arranged in a vicinity of the manual input device—Each proximity sensor is configured to generate a proximity sensor signal in response to presence of a hand of a user in a vicinity of the proximity sensor. Furthermore, the user interface comprises a processing circuitry configured to control the function of the vehicle based on the user input signal and the one or more proximity sensor signals.

In a further possible implementation form of the first aspect, the processing circuitry is configured to control the function of the vehicle by:

generating a user identification signal, e.g. a user identification flag based on the one or more proximity sensor signals, the user identification signal indicating whether the user is probably a driver of the vehicle; and controlling the function of the vehicle based on the user identification signal.

In a further possible implementation form of the first aspect, generating the user identification signal comprises:

starting a time frame in response to the one or more proximity sensor signals indicating that the hand is located on a driver's side of the vehicle; and during the time frame, generating the user identification signal so as to indicate that the user is the driver of the vehicle.

In a further possible implementation form of the first aspect, the processing circuitry is configured to terminate or block the function of the vehicle in response to the user identification signal indicating that the user is the driver of the vehicle and the function is a safety critical function, i.e. a function whose manual operation may result in safety risks.

In a further possible implementation form of the first aspect, the processing circuitry is further configured to generate an alert for the user in response to the user identification signal indicating that the user is the driver of the vehicle and the function is a safety critical function, i.e. a function whose manual operation may result in safety risks. The alert may comprise an audible signal or a visible signal or both.

In a further possible implementation form of the first aspect, the manual input device is configured to be placed in a center console or in a front console of the vehicle.

In a further possible implementation form of the first aspect, at least one of the one or more proximity sensors is configured to be arranged on a driver's side of the vehicle.

In a further possible implementation form of the first aspect, at least one of the one or more proximity sensors is configured to be arranged on a co-driver's side of the vehicle.

In a further possible implementation form of the first aspect, the processing circuitry is integrated in the manual input device.

In a further possible implementation form of the first aspect, the manual input device comprises one or more of the following input elements: a touch screen, a rotating knob, a press button, a slider, a trackball and a stick.

In a further possible implementation form of the first aspect, the processing circuitry is configured to control the function of the vehicle based on the user input signal, the one or more proximity sensor signals and a driving state of the vehicle.

In a further possible implementation form of the first aspect, the user interface is configured to control a selected function of a plurality of functions of the vehicle, wherein each function has a function type, e.g. a safety critical function and a safety non-critical function, and wherein the processing circuitry is configured to control the selected function of the vehicle based on the user input signal, the one or more proximity sensor signals and the function type of the selected function.

According to a second aspect a vehicle, in particular a car is provided, comprising a user interface according to the first aspect.

In a further possible implementation form of the second aspect, the manual input device of the user interface according to the first aspect is placed in a center console or in a front console of the vehicle according to the second aspect.

In a further possible implementation form of the second aspect, at least one of the one or more proximity sensors of the user interface according to the first aspect is arranged on a driver's side of the vehicle according to the second aspect.

In a further possible implementation form of the second aspect, at least one of the one or more proximity sensors of the user interface according to the first aspect is arranged on a co-driver's side of the vehicle according to the second aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
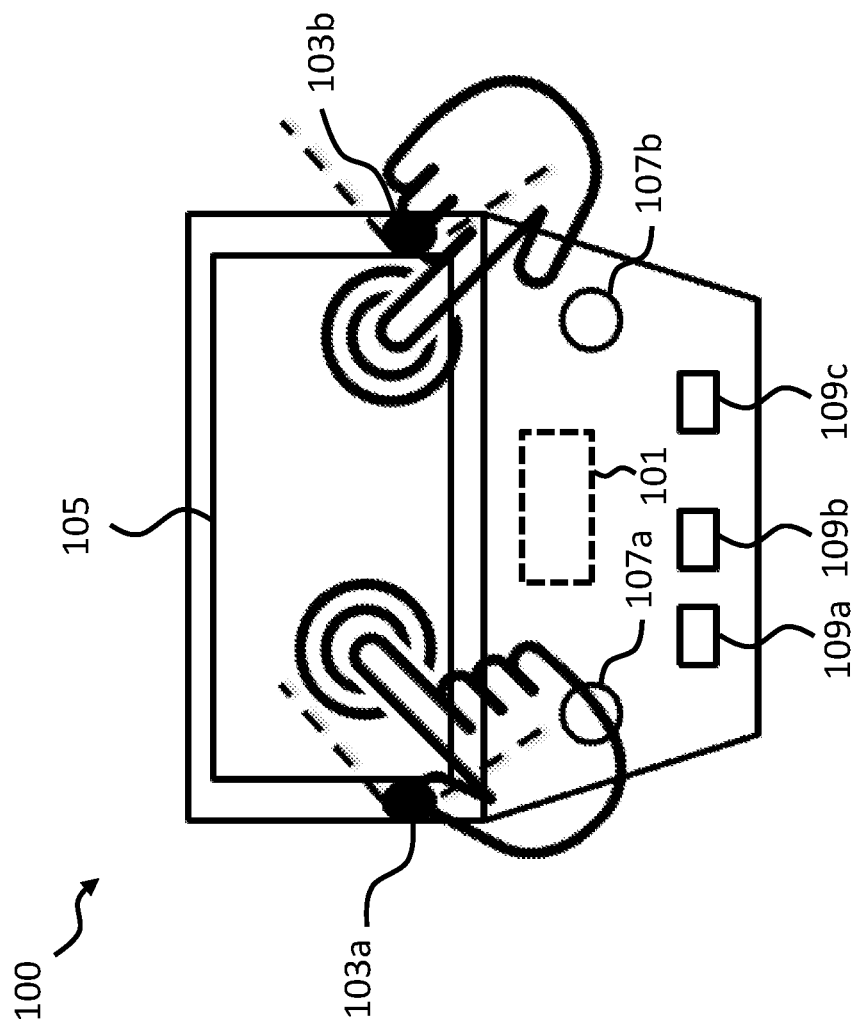
FIG. 1 is a schematic diagram illustrating an user interface for controlling a function of a vehicle according to an embodiment.

FIG. 1 is a schematic diagram illustrating a user interface 100 for controlling, i.e. operating a function of a vehicle, in particular a car. A further embodiment of the user interface 100 for controlling, i.e. operating a function of a vehicle, in particular a car is illustrated in FIG. 2.

Figure 2:
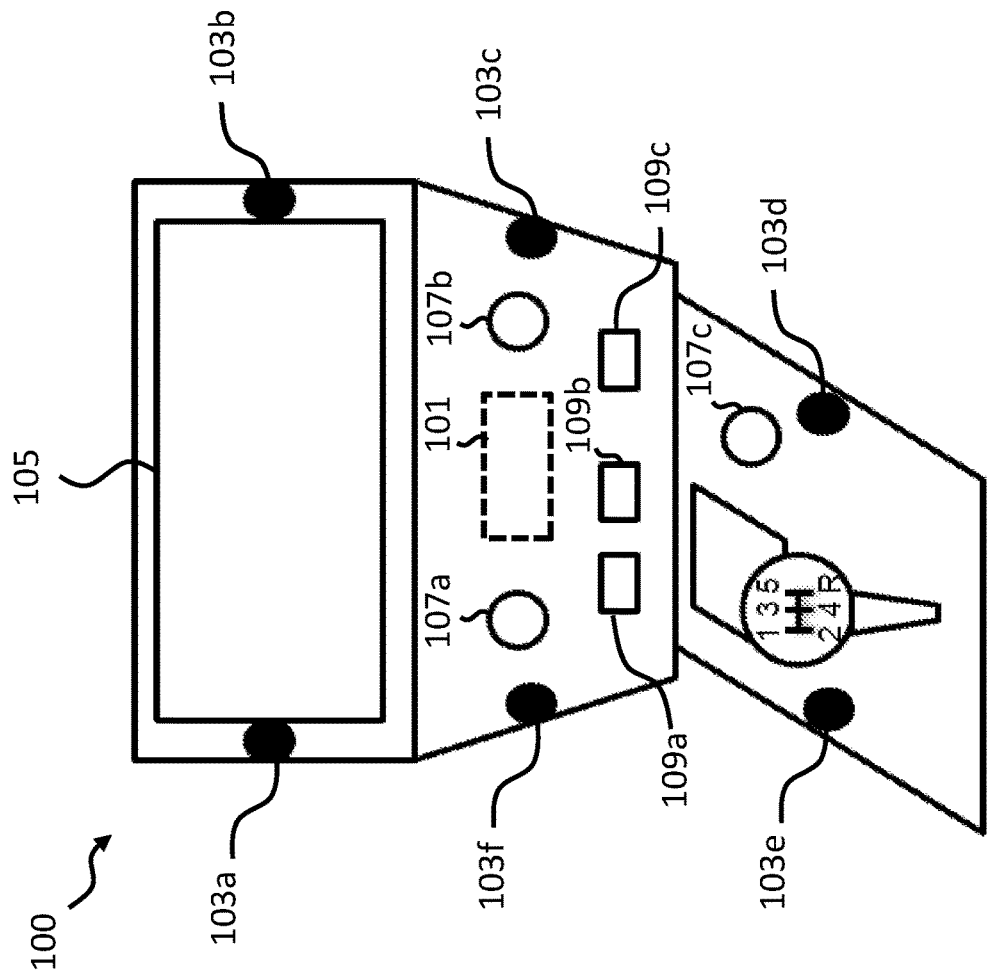
FIG. 2 is a schematic diagram illustrating an user interface for controlling a function of a vehicle according to a further embodiment.

In the embodiment shown in FIGS. 1 and 2 the user interface 100 comprises a plurality of manual input devices, including a touch screen 105, rotatable control knobs 107a-c and pressable control buttons 109a-c. Each manual input device is configured to generate a user input signal in response to being manually actuated by a user. For instance, the touch screen 105 may generate a user input signal when a finger of the user presses onto or swipes over the touch screen 105. In an embodiment, the plurality of manual input devices, including the touch screen 105, the rotatable control knobs 107a-c and the pressable control buttons 109a-c may be arranged in a center console or in a front console of the vehicle.

As illustrated in FIGS. 1 and 2, the user interface 100 further comprises proximity sensors 103a-f arranged in the vicinity of the plurality of manual input devices, i.e. the touch screen 105, the rotatable control knobs 107a,b and the pressable control buttons 109a-c. Each proximity sensor 103a-f is configured to generate a respective proximity sensor signal in response to the presence of the hand of a user in the vicinity of the proximity sensor 103a-f. By way of example, in the embodiment shown in FIG. 1 the user interface 100 comprises two proximity sensors 103a, 103b arranged in the vicinity of the plurality of manual input devices, while in the embodiment shown in FIG. 2 the user interface 100 comprises six proximity sensors 103a-f arranged in the vicinity of the plurality of manual input devices. As will be appreciated, the more proximity sensors 103a-f the user interface 100 comprises, the better the user interface 100 will be able to detect the presence of an object, such as the hand of a user operating the manual input devices of the user interface 100.

In an embodiment, the user interface 100 may be arranged in the center console of a car, where the steering wheel and, thus, the driver's seat is located to the left of the center console. In a further embodiment, the user interface 100 may be arranged in the center console of a car, where the steering wheel and, thus, the driver's seat is located to the right of the center console. As illustrated in FIGS. 1 and 2, one or more of the proximity sensors 103a-f may be arranged on a driver's side of the car, while the other proximity sensors 103a-f may be arranged on a co-driver's side of the vehicle.

As illustrated in FIGS. 1 and 2, the user interface 100 further comprises a processing circuitry 101 configured to control a function of the vehicle based on the user input signal(s) provided by the manual input device(s) 105, 170a-c, 109a-c and the proximity sensor signals provided by the proximity sensors 103a-f. The processing circuitry 101 may comprise hardware and software. The hardware may comprise analog circuitry or digital circuitry, or both analog and digital circuitry. Digital circuitry may comprise components such as application-specific integrated circuits (ASICs), field-programmable arrays (FPGAs), digital signal processors (DSPs), or general-purpose processors. In particular, the filters mentioned herein may be implemented in hardware or in software or in a combination of hardware and software. In one embodiment, the processing circuitry 101 comprises one or more processors and a non-transitory memory connected to the one or more processors. The non-transitory memory may carry executable program code which, when executed by the one or more processors, causes the device user interface 100 to perform the operations or methods described herein"

In an embodiment, the function of the vehicle controlled by the processing circuitry 101 of the user interface 100 based on the user input signal(s) provided by the manual input device(s) 105, 170a-c, 109a-c and the proximity sensor signals provided by the proximity sensors 103a-f may be a software application, i.e. an APP being executed by the processing circuitry 101 of the user device 100 or by another electronic system of the vehicle.

In an embodiment, the processing circuitry 101 of the user interface 100 is configured to control the function of the vehicle by generating a user identification signal based on the proximity sensor signals provided by the plurality of proximity sensors 103a-f, wherein the user identification signal indicates whether the user operating the manual input device(s) 105, 107a-c, 109a-c of the user interface 101 is the driver of the vehicle. In an embodiment, the user identification signal may be a flag or bit set by the processing circuitry 101. Moreover, the processing circuitry 101 is configured to control a function of the vehicle based on the user identification signal. In an embodiment, the processing circuitry 101 is configured to terminate or block the function of the vehicle in response to the user identification signal indicating that the user is the driver of the vehicle, if the function is a safety critical function of the vehicle. As used herein a safety critical function of the vehicle is a function whose operation may distract the driver of the vehicle. Furthermore, the processing circuitry 101 of the user interface 100 may be configured to generate an alert for the user in response to the user identification signal indicating that the user is the driver of the vehicle, if the function is a safety critical function of the vehicle.

In an embodiment, for generating the user identification signal the processing circuitry 101 of the user interface 100 is configured to start a time frame in response to the one or more proximity sensor signals indicating that the hand operating the manual input device 105, 107a-c, 109a-c is located on a driver's side of the vehicle. During the time frame, the processing circuitry 101 of the user interface 100 is configured to generate the user identification signal so as to indicate that the user is the driver of the vehicle.

In an embodiment, the processing circuitry 101 of the user interface may be integrated with a processing circuitry of the manual input device(s) 105, 107a-c, 109a-c configured to generate the user input signal(s).

The embodiments described above provide an improved driving safety by preventing a driver from operating the user interface 100 of a vehicle, e.g. a car, when he drives the car. On the other hand, the operation actions can still be performed using the user interface 100 of the car by the co-driver for controlling a function of the car.

During the vehicle's movement especially at high speeds, certain types of complex functions and/or operations are deemed to be distracting to the driver and risky to the road safety, namely the safety critical functions of the vehicle. Some examples of such distracting complex operations include: typing a destination address in a navigation application; trying to understand vehicle setting items and changing settings or preferences in a human-machine interface (HMI) of the vehicle; using certain types of software applications (also referred to as "apps") for specific purposes such as chatting with messengers in text, watching a video in a video-player, or playing a computer game; and reading a relatively long text such as a user agreement and confirming to agree with it.

On the other hand, simple functions and operations demand normally very short operation time or little attention from the user, and such functions and operations are not deemed as being distracting and risky (herein referred to as safety non-critical functions). Hence, they may be allowed to be performed by the driver during the vehicle's movement. For instance, according an embodiment the allowed functions and operations, i.e. the safety non-critical functions of the vehicle may comprise: opening or closing the vehicle windows; switching on/off the air-conditioner and adjusting the inside temperature of the vehicle; playing an audio file, or similar operations like pausing, skipping or selecting a track; picking up or dialing a Bluetooth hands-free call.

The main difference between complex, i.e. safety critical and simple, i.e. safety non-critical functions and operations is that simple functions normally require only limited human-machine operations and quick action on physical buttons or knobs. The driver is barely distracted during the operation process. Nevertheless, complex functions and operations demand reading/understanding of relatively complicated content or substantial text input into the user interface 100. The driver's attention is easily and for relatively long time migrated from the road condition to the human-machine interactivity, and hence is distracted. Embodiments disclosed herein allow avoiding distraction of the driver by prohibiting complex functions and operations, i.e. the safety critical functions, and warning the driver by means of an audible or visible safety alert.

Embodiments of the user interface 100 may implement a two-stage approach. In an embodiment, the user interface 100 may be configured to first distinguish based on proximity sensor signal(s) provided by the one or more proximity sensors 103a-e whether a manual input operation is conducted by the driver or the co-driver of the vehicle. Furthermore, the processing circuitry 101 of the user interface 100 may be configured to combine this assessment with other traffic/vehicle information to identify whether the operation of the manual input device is for operating a safety critical function and issue a security alert to the driver. Thus, in an embodiment, the user interface 100 is configured to control a selected function of a plurality of functions of the vehicle, each function being either a safety critical function or a safety non-critical function of the vehicle, wherein the processing circuitry 101 of the user interface 100 is configured to control the selected function of the vehicle on the basis of the user input signal, the one or more proximity sensor signals and the function type of the selected function, i.e. whether the selected function is safety critical function or a safety non-critical function. In a further embodiment, the processing circuitry 101 of the user interface is configured to control the function of the vehicle based on the user input signal, the one or more proximity sensor signals and a driving state of the vehicle, such as whether the vehicle is moving with a speed larger or smaller than a speed threshold.

As discussed above, according to embodiments the user interface 100 is configured to distinguish whether the operation of the user interface 100, such as an in-vehicle infotainment (IVI) system 100, is performed by the driver or the co-driver of the vehicle. For instance, in the embodiment shown in FIG. 1, assuming a left-steered vehicle, when the driver stretches out his right arm and operates in a control area of the user interface 100 with his right hand, the left proximity sensor 103*a* will detect the proximity of the arm/hand while the right proximity sensor 103*b* will not. On the other hand, when the co-driver tries to operate in the control area of the user interface 100, the right proximity sensor 103*b* will be triggered, i.e. generate a proximity sensor signal, while the left proximity sensor 103*a* will not. Through the trigger pattern of the proximity sensors 103*a-f* on the left and right edges, operations can be identified either from the left or the right side, i.e. the driver or the co-driver side. The common operation mode is to have only one hand/arm to operate within the operation area at the same time, i.e. only the proximity sensor(s) 103*a-d* on either the left or the right side being triggered.

In case the proximity sensors 103*a-f* on both sides of the user interface 100 are being triggered, there might be various possibilities. For example, an arm is stretching through and the hand is falling out of the operation region and not taking any action on the manual input devices 105, 107*a-c*, 109*a-c* according to an embodiment. In another embodiment, two persons from the driver and the co-driver seats are operating simultaneously in the operation area respectively with their right or left hands stretching into this area. In this case, no matter whether the safety threatening operations are really performed by the driver or not, they may all be treated as being conducted by the driver and should be accordingly prohibited for safety reasons.

In a further embodiment, the processing circuitry 101 of the user device 100 may be configured to control the function of the vehicle on further data (in addition to the proximity sensor signal(s) provided by the proximity sensors 103*a-f* and the user input signal(s) provided by the manual input device 105, 107*a-c*, 109*a-c*), such as data provided by a gesture recognition mechanism implemented in the vehicle.

Figure 3:
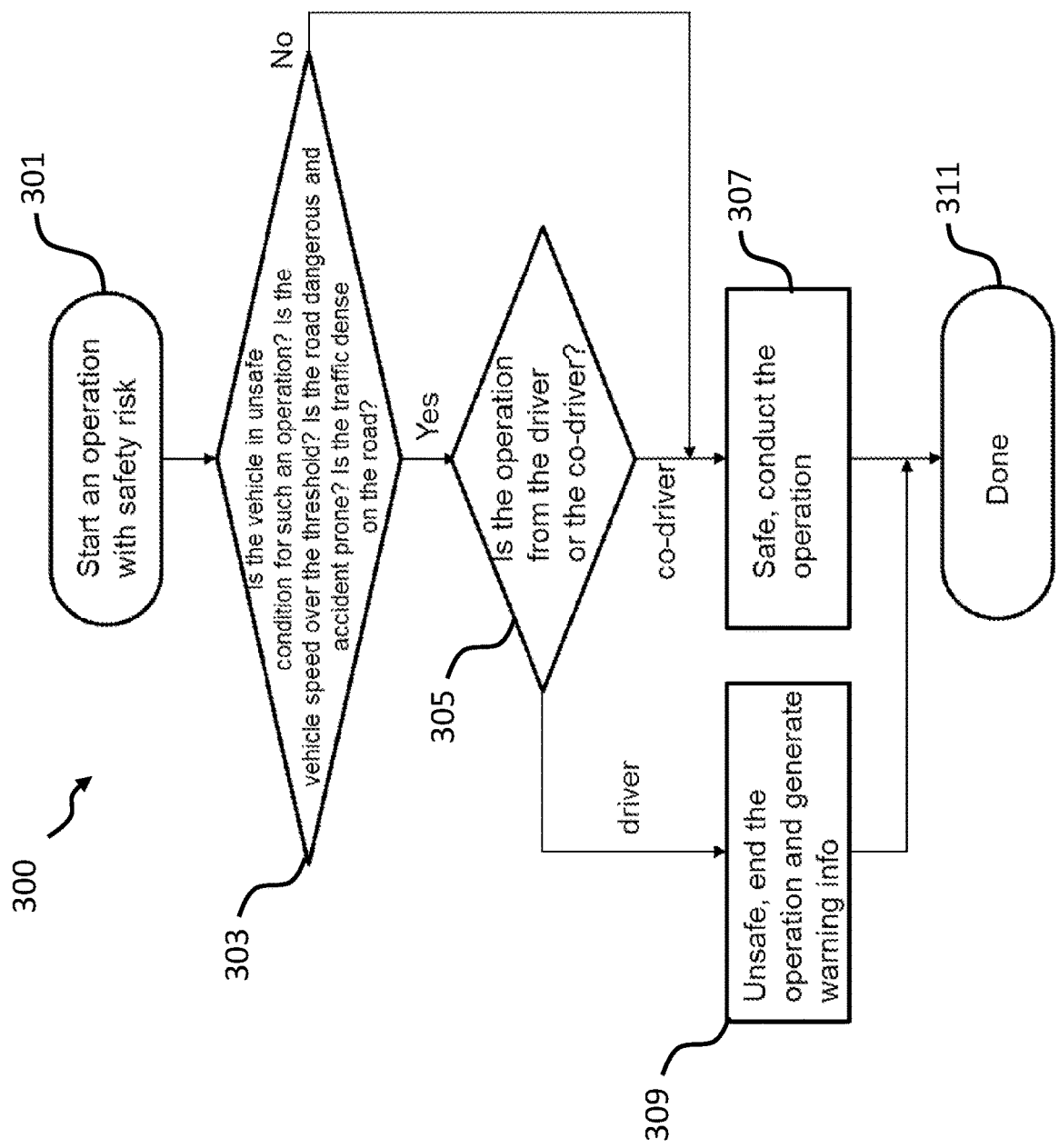
FIG. 3 is a flow diagram illustrating a procedure of controlling a function of a vehicle implemented by an user interface according to an embodiment.

FIG. 3 is a flow diagram illustrating a procedure 300 of controlling a function of a vehicle implemented by the user interface 100 according to an embodiment. The procedure 300 comprises the following steps:

First, the procedure 300 starts with a safety critical operation/function of the vehicle, for instance, trying to type a message in a chat window displayed on the touch screen 105 or a destination address into a navigation system of the vehicle, while the vehicle is moving with a high speed (block 301 of FIG. 3).

A next step is to check whether the vehicle or road condition is safe enough for such a safety critical function/operation assuming that the operation is performed by the driver who is supposed to maximally concentrate on driving (block 303 of FIG. 3): in an embodiment the processing circuitry 101 of the user device 100 may use as a metric, whether the vehicle speed is beyond a speed threshold, which might be variable according to respective application demands. When the vehicle speed is very low or stands still, the operations can be treated as riskless are allowed to be conducted immediately. Otherwise if the vehicle speed is larger than the threshold, the operation can be considered to be too risky for the safety and it is required to identify who is the operator. Other road information affecting the driving state of the vehicle can also be collected to identify operation risks of distracting the driver, such as specially marked dangerous and accident-prone road segments in the navigation map, or over-crowded and close overtaking vehicles on the next fast lane, and the like. The purpose of this step is to identify the safety risk assuming it is the driver who is conducting the operation and is being distracted from driving.

After the safety risk is identified, a next step is to confirm whether the function/operation is performed by the driver or by the co-driver who initiates the operation (block 305 of FIG. 3). If the function/operation is performed by the co-driver, it is safe and the operation can be freely conducted at any time (block 307 of FIG. 3). Otherwise a driver's operation is determined as unsafe and should be prohibited, while issuing a visible or audible alert message (block 309 of FIG. 3). Finally, the procedure is completed (block 311 of FIG. 3).

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

What is claimed is:

1. A user interface for controlling a function of a vehicle, the user interface comprising:
   a manual input device configured to generate a user input signal in response to being manually actuated by a user;
   one or more proximity sensors arranged in a vicinity of the manual input device, each respective proximity sensor being configured to generate a proximity sensor signal in response to a presence of a hand in a vicinity of the respective proximity sensor, wherein at least one of the one or more proximity sensors is arranged on a driver's side of the vehicle; and
   processing circuitry configured to control the function of the vehicle based on the user input signal and the one or more proximity sensor signals by:
   generating a user identification signal based on the one or more proximity sensor signals, the user identification signal indicating whether the user is a driver of the vehicle,
   starting a time frame in response to the one or more proximity sensor signals indicating that the hand is located on a driver's side of the vehicle,
   during the time frame, generating the user identification signal so as to indicate that the user is the driver of the vehicle, and
   controlling the function of the vehicle based on the user identification signal, wherein the processing circuitry is configured to terminate or block the function of the vehicle in response to the user identification signal indicating that the user is the driver of the vehicle.

2. The user interface of claim 1, wherein the processing circuitry is further configured to generate an alert for the user in response to the user identification signal indicating that the user is the driver of the vehicle.

3. The user interface of claim 1, wherein the manual input device is placed in a center console or in a front console of the vehicle.

4. The user interface of claim 1, wherein at least one of the one or more proximity sensors is arranged on a co-driver's side of the vehicle.

5. The user interface of claim 1, wherein the processing circuitry is integrated in the manual input device.

6. The user interface of claim 1, wherein the manual input device comprises one or more of the following input elements: a touch screen, a rotating knob, a press button, a slider, a trackball, and/or a stick.

7. The user interface of claim 1, wherein the processing circuitry is configured to control the function of the vehicle based on the user input signal, the one or more proximity sensor signals, and a driving state of the vehicle.

8. The user interface of claim 1, wherein the function of the vehicle is a selected function of a plurality of functions of the vehicle, wherein each respective function has a function type, and wherein the processing circuitry is configured to control the selected function of the vehicle based on the user input signal, the one or more proximity sensor signals and the function type of the selected function.

9. A vehicle, comprising a user interface according to claim 1.

* * * * *